US005529148A

United States Patent [19]

O'Leary

[11] Patent Number: 5,529,148

[45] Date of Patent: Jun. 25, 1996

[54] AUTOMATIC BRAKE AND HOLD MECHANISM FOR SLIDING RODS

[76] Inventor: Thomas M. O'Leary, 25 Strathcona Drive, St. Catharines, Ontario, Canada, K2M 2A8

[21] Appl. No.: 262,124

[22] Filed: Jun. 17, 1994

Related U.S. Application Data

[63] Continuation-in-part of Ser. No. 111,126, Aug. 24, 1993, abandoned.

[51] Int. Cl.[6] .............................. G05G 7/14; B60N 1/00; B60R 21/32

[52] U.S. Cl. ................................ 188/67; 16/49; 188/300; 267/64.12

[58] Field of Search .................................... 16/49, 63–65, 16/70, 82, 85, DIG. 10, DIG. 17; 188/67, 300; 74/533–537, 575, 577 M; 92/5 L; 292/305, 306, DIG. 19; 403/322, 327, 330; 267/64.12

[56] References Cited

U.S. PATENT DOCUMENTS

| | | | |
|---|---|---|---|
| 836,303 | 11/1906 | Christensen | 188/67 |
| 2,227,397 | 12/1940 | Lucker | 188/67 X |
| 3,105,264 | 10/1963 | Truhon | 16/49 X |
| 3,893,730 | 7/1975 | Homier et al. | 188/67 X |
| 4,191,503 | 3/1980 | Neff et al. | 188/67 X |
| 4,194,264 | 3/1980 | Stoffregen | 16/DIG. 17 X |
| 4,357,731 | 11/1982 | Strauss . | |
| 4,387,926 | 6/1983 | Van Eerden et al. | 188/67 X |
| 4,639,969 | 2/1987 | Obenshain . | |
| 4,722,116 | 2/1988 | Erickson | 16/49 |
| 4,815,163 | 3/1989 | Simmons | 16/49 |
| 4,920,609 | 5/1990 | Lin . | |
| 4,938,319 | 7/1990 | Erust | 188/67 |
| 5,027,674 | 7/1991 | Nolte et al. . | |
| 5,048,150 | 9/1991 | Guerin | 292/306 X |
| 5,131,115 | 7/1992 | Sarto . | |
| 5,148,717 | 9/1992 | Yamaguchi . | |

FOREIGN PATENT DOCUMENTS

| | | | |
|---|---|---|---|
| 196263 | 3/1958 | Austria | 188/67 |

*Primary Examiner*—Douglas C. Butler
*Attorney, Agent, or Firm*—John J. Gaydos

[57] ABSTRACT

A telescoping door closer or strut is disclosed wherein a sliding rod is automatically held at any desired position of extension or retraction with respect to an associated housing. An automatic brake and hold mechanism for retaining the rod in the desired position includes an annular disk-like brake mounted on the rod and pivotable from a transverse position where the rod slides freely therethrough and an oblique position where the rod is cramped and retained by the brake. One edge or side of the brake is restrained to cause it to pivot into the oblique position upon movement of the rod in a first direction. A stop attached to the housing engages the opposite side of brake to keep it in the transverse position upon movement of the rod in the opposite direction.

7 Claims, 5 Drawing Sheets

AUTOMATIC BRAKE AND HOLD MECHANISM FOR SLIDING RODS

CROSS-REFERENCE TO RELATED APPLICATIONS

This application is a continuation-in-part of application Ser. No. 08/111,126 filed Aug. 24, 1993, now abandoned.

BACKGROUND OF THE INVENTION

1. Field of the Invention

This invention relates to devices, such as door closers, wherein a sliding rod is attached to a door or the like to close it or hold it in a desired position.

2. Description of Prior Art

In many door closers of the telescoping spring return type, a braking mechanism is mounted on a central telescoping member or rod to hold a door open. This design operates when the brake, usually a clip or washer located about the rod, is manually positioned to prevent the rod from retracting into a spring-containing housing. A difficulty with this type of closure is that it must be manually set and released, and this is inconvenient if a person's hands are not free, such as when an article is being carried through the doorway.

Devices have been designed to overcome this problem. U.S. Pat. No. 4,920,609 issued on May 1, 1990 to Lin and U.S. Pat. No. 4,357,731 issued on Nov. 9, 1982 to Strauss disclose latching mechanisms to hold a door open, and upon further opening of the door, a release mechanism is employed to allow the door to close. However, the latching mechanisms in these patents are located at a fixed distance along the central rod of these inventions which does not cater for intermediate latching along the rod, thereby not being able to hold doors open at any desired intermediate position.

U.S. Pat. No. 4,639,969 issued Feb. 3, 1987 to Obenshain discloses a door closer mechanism with a pawl and ratchet mechanism to hold a door open at an intermediate position. By pushing the door tending to close it, the ratcheting mechanism is reversed automatically, thereby allowing the door to close. However, a difficulty with this device is that the door can close unexpectedly, such as by a gust of wind or an inadvertent push, and possibly exposing an unwary user to a risk of injury.

SUMMARY OF THE INVENTION

In the present invention, a device is provided to automatically hold doors, lids, automobile hoods, covers, pivoting windows, vents and the like, in a desired open position, and which may be automatically or manually released or deactivated.

According to one aspect of the invention, there is provided an automatic brake and hold device for a telescoping door closer having a housing and a rod biased to move in a biased direction into or out of the housing. The improvement comprises a brake having opposed sides and a disc-like annular portion slidably located on the rod for frictionally cramping the rod upon the brake being pivoted from a transverse to an oblique position relative to the rod. The housing includes means for engaging one side of the brake to cause the brake to be pivoted and retained in said oblique position upon movement of the rod in the biased direction. Also, a stop is located on the opposite side of the brake to prevent the brake from pivoting into an oblique position upon movement of the rod toward the stop.

According to another aspect of the invention, there is provided an automatic brake and hold device for a telescoping door closer or the like having a housing and a rod adapted to be moved into or out of the housing. The device comprises a brake having a disc-like, annular portion slidably located on the rod for frictionally cramping the rod upon the brake being pivoted from a transverse position to an oblique position relative to the rod. The housing includes means for engaging one side of the brake to cause the brake to be pivoted into said oblique position upon movement of the rod in a first direction. Also, a stop is adapted to be attached to the housing and located on the opposite side of the brake to engage and prevent the brake from pivoting into an oblique position upon movement of the rod in a second direction opposite to the first direction.

DESCRIPTION OF THE DRAWINGS

Preferred embodiments of the invention will now be described, by way of example, with reference to the accompanying drawings, in which.

DETAILED DESCRIPTION OF THE PREFERRED EMBODIMENTS

Figure 1:
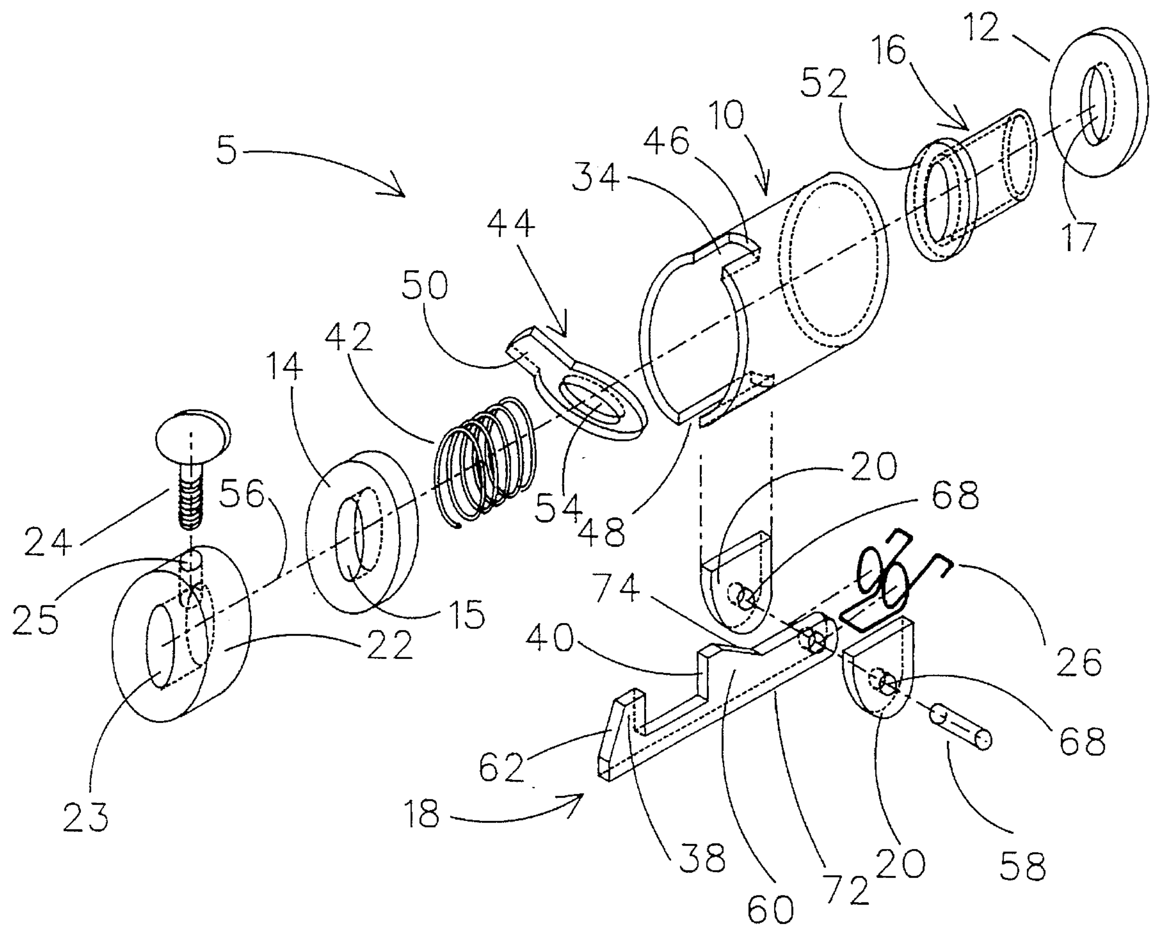
FIG. 1 is an exploded perspective view of one embodiment of an automatic brake and hold mechanism according to the present invention.
Figure 2:
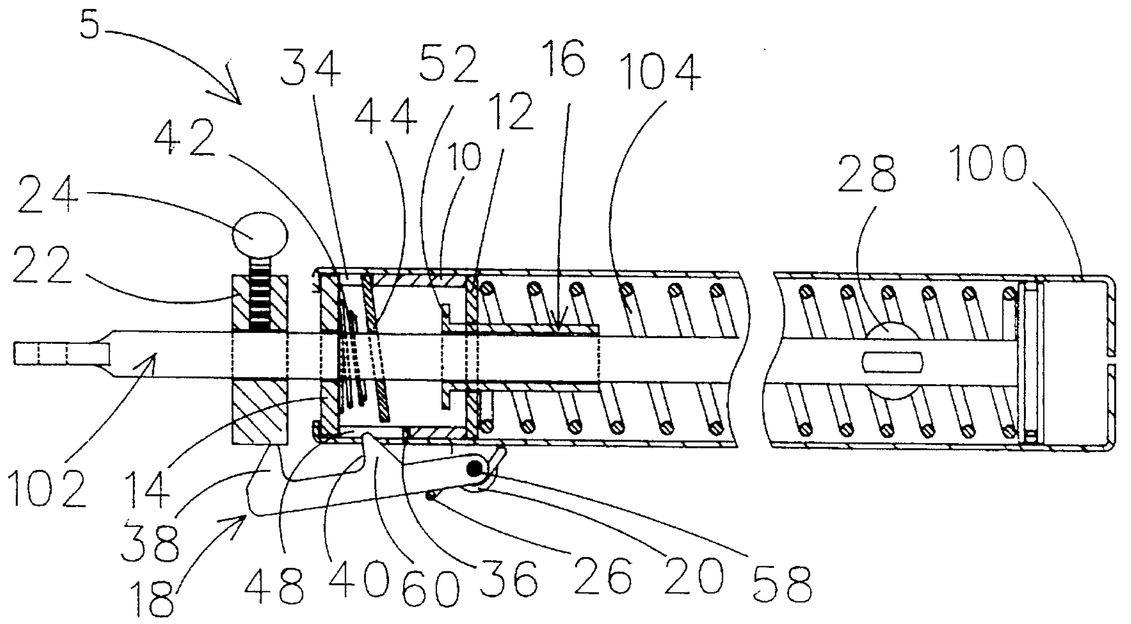
FIG. 2 is a vertical sectional view of a door closer incorporating the automatic brake and hold mechanism of FIG. 1 showing the mechanism in the brake and hold mode.
Figure 3:
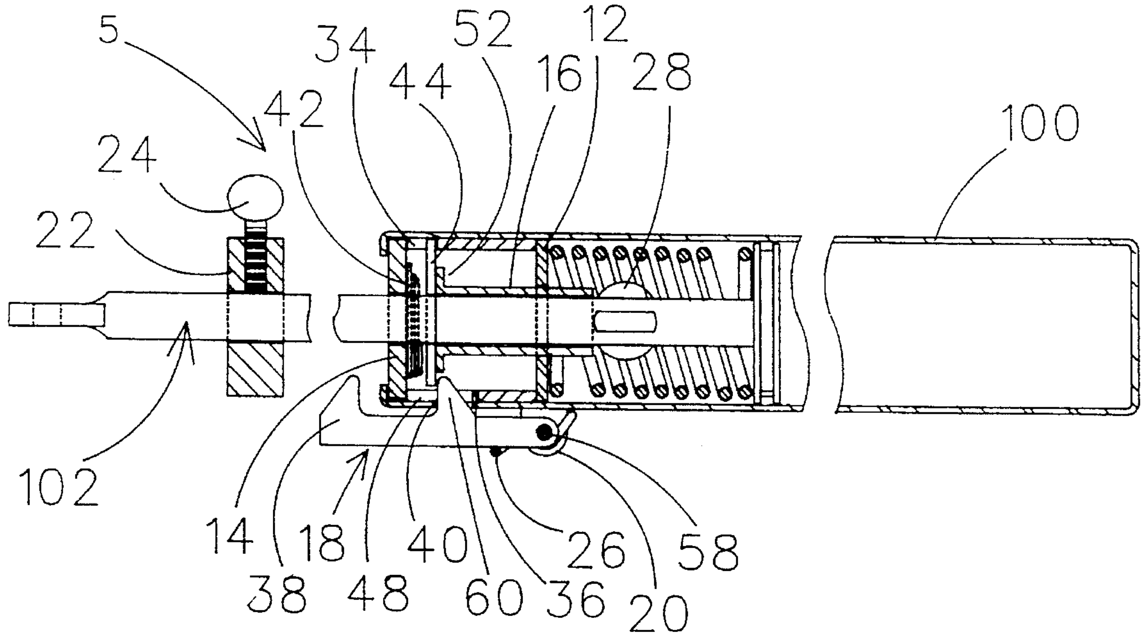
FIG. 3 is a vertical sectional view similar to FIG. 2, but showing the brake and hold mechanism in the brake released mode.

Referring to the drawings, wherein primed reference numerals are used to indicate similar parts through the various views, a preferred embodiment of an automatic brake and hold mechanism according to the present invention is generally indicated in FIGS. 1 to 3 by reference numeral 5. Brake and hold mechanism 5 is shown located about a central rod 102 and includes a hold-open barrel 10, which may be part of an enclosing housing or casing 100, a brake 44, a release sleeve 16, a brake spring 42, an outer brake closure 14, an inner brake closure 12, a latch 18, a latch spring 26, a clevis pin 58, a clevis 20, a release collar 22, and a retention screw 24. All components may be constructed of metal or plastic material, and be incorporated into casing 100 as indicated in FIGS. 2 and 3.

The general configuration of brake and hold mechanism 5 in cross-section is circular, however, this is for illustrative purposes only. Rods 102 with different cross-sectional shape may be used successfully with or without a corresponding change in the shape of the components of the device. Likewise the shape of rod 102 may be straight, curved, rigid, flexible, solid, or hollow.

Hold-open barrel 10 is a hollow cylinder with a slot 34 cut into it to receive a brake tab 50 of brake 44 to allow brake tab 50 to move longitudinally while restricting its angular movement. Located 180 degrees from slot 34 is a slot 48 also cut into hold-open barrel 10 to allow a brake trip 60 of a latch 18 access to brake 44, and allow an anti-rotational tab 36 of casing 100 to be bent into slot 48 thereby preventing hold-open barrel 10 from rotating about its longitudinal axis within casing 100.

Abutting one end of hold-open barrel 10 is an outer closure 14, which is a disk having a central hole or aperture 15 to permit central rod 102 to pass therethrough.

Abutting the opposite end of hold-open barrel 10 is an inner closure 12, which is also a disk having a central hole or aperture 17 to allow a release sleeve 16 to pass therethrough, but which is too small to allow a release sleeve collar 52 to pass therethrough.

Located within hold-open barrel 10 is brake 44, including an annular disc-like portion of predetermined shape having tab 50 protruding into slot 34, and which has a central hole or aperture 54 shaped to permit central rod 102 to pass therethrough.

A resilient brake spring 42 is located about the longitudinal axis 56 of brake and hold mechanism 5 and is located between outer closure 14, and brake 44 such that it resiliently biases tab 50 into slot 34 to prevent rotation of brake 44 about longitudinal axis 56 of mechanism 5.

Release sleeve 16 is a hollow cylinder with one end flanged to form release sleeve collar 52, and is located about longitudinal axis 56 and positioned such that it is free to move longitudinally through aperture 17 of inner closure 12, so that release sleeve 52 abuts against brake 44 as seen in FIG. 3, holding brake 44 in a transverse position normal to the longitudinal axis 56 of central rod 102.

Clevis 20 when attached to casing 100 forms a U-shaped bracket positioned such that latch 18 will pivot about clevis pin 58 located in holes 68 of clevis 20, and brake trip 60 will enter into brake latch slot 48 sufficiently to engage brake 44, as seen in FIG. 3.

Latch 18 is generally rectangular in shape having at one end a release trip 38, while at the other end a hole of sufficient size to allow clevis pin 58 to be inserted therein and latch 18 to pivot freely about clevis pin 58.

Latch spring 26 is a resilient spring, shaped such that both ends of it wrap around the respective mating parts of clevis 20 to give it purchase about clevis pin 58 and to resiliently bias latch 18 radially towards the longitudinal axis 56 of central rod 102.

Release collar 22 is located about central rod 102 and is a disk with a central aperture 23 to allow central rod 102 to slide therethrough. Release collar 102 has a radially disposed threaded hole 25 formed to threadingly receive a retention thumbscrew 24. Release collar 22 is longitudinally held in position on rod 102 by tightening retention screw 24 thereby securing release collar at any desired position along central rod 102.

Central rod 102 has radial actuator tabs 28 formed through upsetting central rod 102, and are positioned longitudinally along central rod 102 such that they provide for the desired limits of telescoping movement of rod 102 within casing 100.

In operation, referring to FIGS. 2 and 3, brake and hold mechanism 5 is shown incorporated into a door closer of the concentric spring return type comprising generally: casing 100, central rod 102, and a central closer spring 102 which urges or biases rod 102 into casing 100. The door closer is generally affixed between a door (not shown) and its corresponding door jamb (also not shown). Upon opening of the door, central rod 102 is extended telescopically from within casing 100 thereby compressing closer spring 104. When the door is released closer spring 104 acts to retract central rod 102 telescopically into casing 100 and cause the door to close.

However, brake 44, which is biased by brake spring 42 tends to slide along rod 102, and since tab 50 is retained in brake tab slot 34, brake 44 is caused to pivot about tab 50 into an oblique position to frictionally cramp central rod 102, and prevent it from retracting further into casing 100. When the door is opened further, central rod 102 is extended telescopically from casing 100 to again pivot brake 44 into the transverse or normal position, because spring 42 acts as a stop preventing brake 44 from pivoting into the oblique position in the opposite direction, thus relieving the cramping action of brake 44 upon central rod 102.

Upon opening the door still further, such that the door closer is near its maximum extension, release sleeve 16 is engaged by actuator tabs 28 causing sleeve collar 52 to engage one side of brake 44. The other side of brake 44 is engaged by spring 42 acting as a stop. Brake 44 then swings or pivots downwardly until it engages a cam or latch face 74 of brake trip 60. Upon further extension of the door closer, latch 18 is pivoted about clevis pin 58 by brake 44 whose lower edge engagingly moves along face 74 of latch 18 until brake 44, having passed beyond the apex of brake trip 60 of latch 18, is held normal to the axis of central rod 102 by latch face 40 of latch 18, which disengages the brake and hold operation of brake 44.

Central rod 102, being biased by closer spring 104 and without the cramping action of brake 44 to restrain it, then retracts telescopically into casing 100, thereby causing the door to close.

During telescopic retraction of the door closer, latch 18 may be pivoted manually about clevis pin 58, to release brake 44 and cramp central rod 102, thereby preventing further telescopic retraction of the door closer and maintaining the door in an open position.

When brake 44 is disengaged and telescopic retraction of central rod 102 within casing 100 is near the maximum predetermined retraction, release collar 22 secured to central rod 102 by retention screw 24 engages an inclined cam or striker face 62 of latch 18. Upon further retraction of central rod 102 within casing 100 to its maximum predetermined retraction, release collar 22 slidingly engaging striker face 62 of latch 18 at an oblique angle, causes latch 18 to pivot about clevis pin 58, releasing brake 44 from brake trip 60 and thereby returning brake 44 to the brake and hold mode as indicated in FIG. 2.

Figure 4:
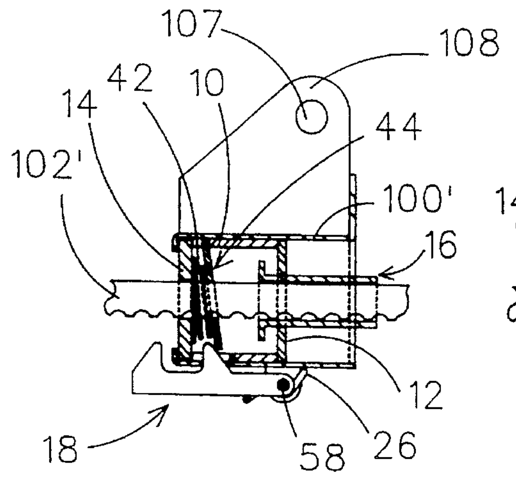
FIG. 4 is a vertical sectional view, partly broken away, showing another embodiment of an automatic brake and hold mechanism incorporated into a pivotable mounting.
Figure 5:
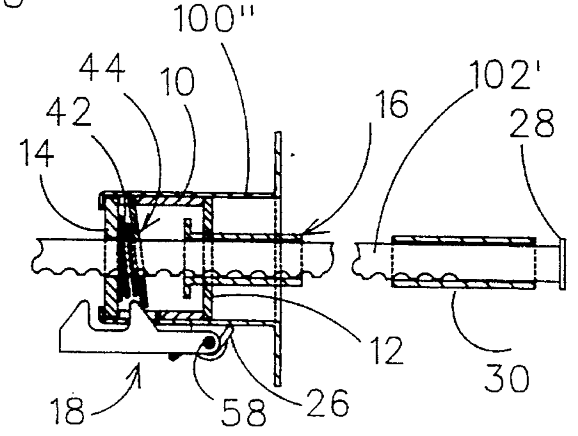
FIG. 5 is a vertical sectional view similar to FIG. 4, but showing an alternative flanged mounting.

Referring next to FIGS. 4 and 5, the brake and hold mechanism is shown incorporated into housings 100' and 100" located about a notched, serrated or grooved rod 102' where the action and effect of the automatic brake and hold mechanism is similar to the action and effect described above in the case of a door closer as shown in FIGS. 2 and 3.

As shown in FIG. 4, the mechanism may be used in a housing 100' that swivels, pivots, or rotates, about a hole 107 in a bracket 108, attached, clamped, or incorporated into such housing. Such an arrangement may be used to hold a cover or lid, or the like, in a desired open position.

As shown in FIG. 5, the mechanism may be used in a flanged housing 100". Such an arrangement may be used to maintain objects at a desired predetermined distance apart.

Figure 11:
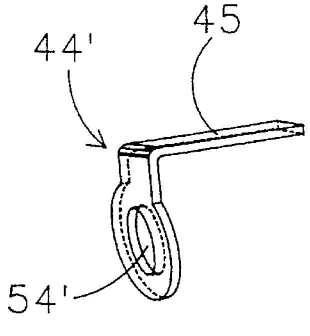
FIG. 11 also shown on the first drawing sheet is a perspective view of a brake with a manual release lever.
Figure 6:
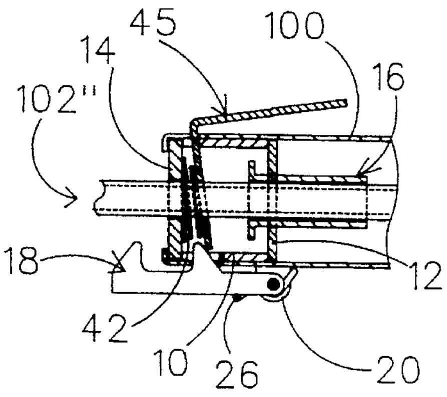
FIG. 6 is a vertical sectional view similar to FIGS. 2 and 3, but showing yet another embodiment with a manual release lever.
Figure 7:
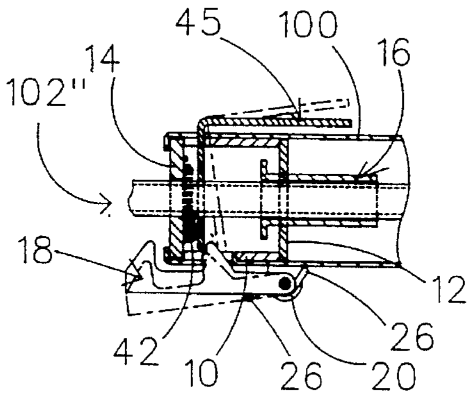
FIG. 7 is a vertical sectional view similar to FIG. 6 illustrating the operation of the FIG. 6 embodiment.

Referring to FIGS. 6, 7 and 11, brake 44 is shown incorporating a manual release lever 45 extending above housing or casing 100. Release lever 45 can be used to manually disengage the brake and hold operation of the automatic brake and hold mechanism by pressing downwardly on it. Such an arrangement could be used, for example, as a telescoping prop to hold an automobile hood or trunk open and to allow the automobile hood or trunk to close upon pressing lever 45. This embodiment also illustrates the use of a hollow rod 102". In this embodiment, brake 44 is an L-shaped member having a first leg formed by release lever 45 and a second leg including a disc-like annular portion for cramping rod 102".

Figure 10:
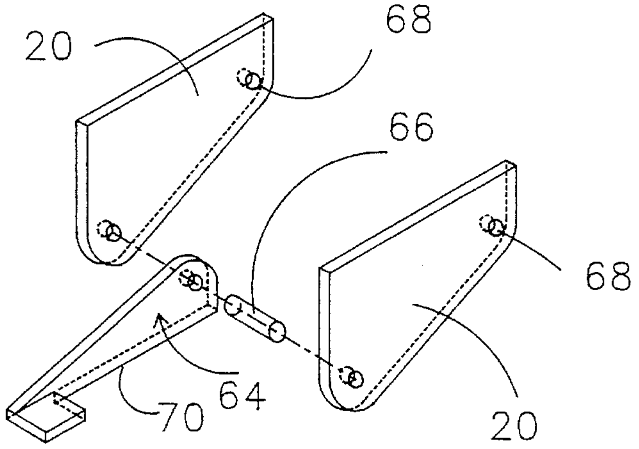
FIG. 10 shown on the first drawing sheet is an exploded perspective view of a brake lock mechanism as employed in the embodiment shown in FIGS. 8 and 9.
Figure 8:
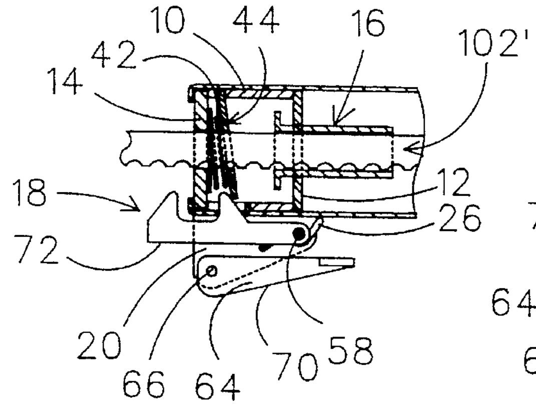
FIG. 8 is a vertical sectional view similar to FIGS. 4 and 5, but showing yet another embodiment of a brake and hold mechanism having a brake lock.
Figure 9:
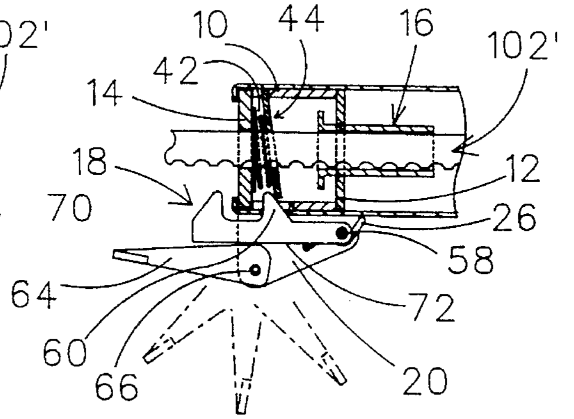
FIG. 9 is a vertical sectional view similar to FIG. 8 illustrating the operation of the FIG. 8 embodiment.

Referring next to FIGS. 8, 9 and 10, the mechanism is shown incorporating a brake lock 64. Such a brake lock when placed as shown in FIG. 8, such that brake lock face 70 is spaced from latch back 72, allows engagement and disengagement of brake 44 in the normal manner. However, when placed as shown in FIGS. 9 and 10 such that brake lock face 70 is adjacent to latch back 72, the engagement and disengagement operations of the automatic brake and hold device are inoperable. When lever 64 is placed as shown in FIG. 9, the central rod 102' is fixed rigidly because brake 44 is pivoted to cramp rod 102' and cannot pivot back normal to rod 102' because it is blocked by brake trip 60. Similarly, where the automatic brake and hold mechanism is disengaged as indicated in FIG. 3, and brake lock 64 is placed as shown in FIG. 9, latch 18 is prevented from pivoting about clevis pin 58, thereby maintaining the disengagement of brake 44 and allowing central rod 102 to traverse freely along its longitudinal axis.

Figure 12:
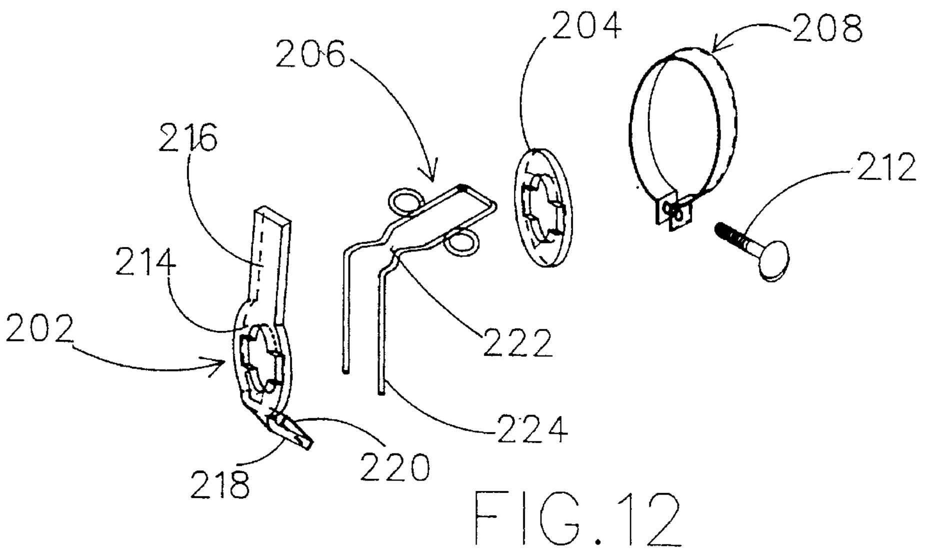
FIG. 12 is an exploded perspective view of yet another embodiment of an automatic brake and hold mechanism according to the present invention.
Figure 13:
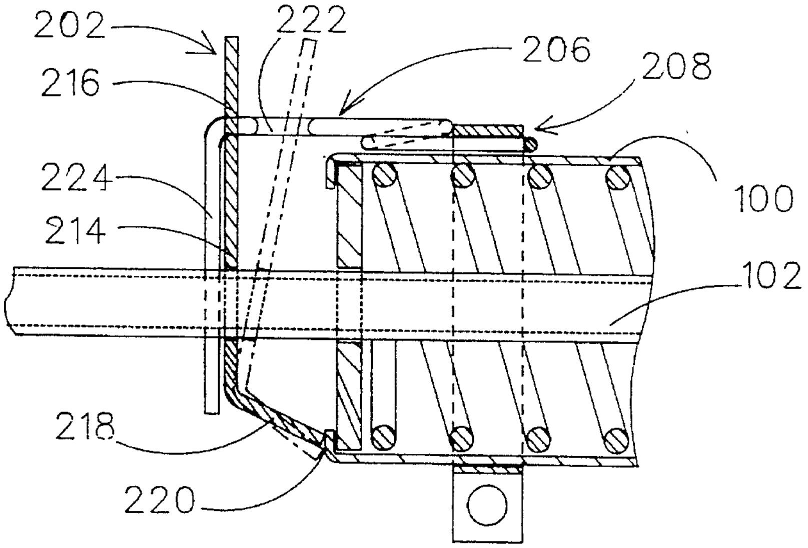
FIG. 13 is a vertical sectional view of a portion of a door closer incorporating the brake and hold mechanism shown in FIG. 12.
Figure 14:
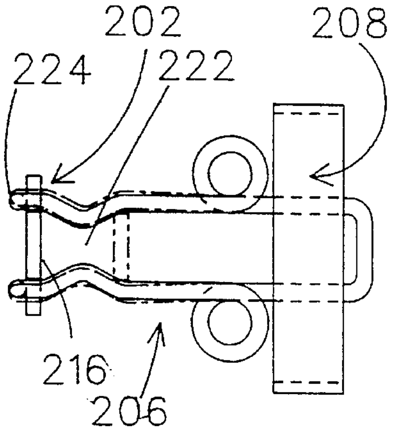
FIG. 14 is a top view of the embodiment shown in FIG. 13 with the door closer removed for the purpose of clarity.
Figure 15:
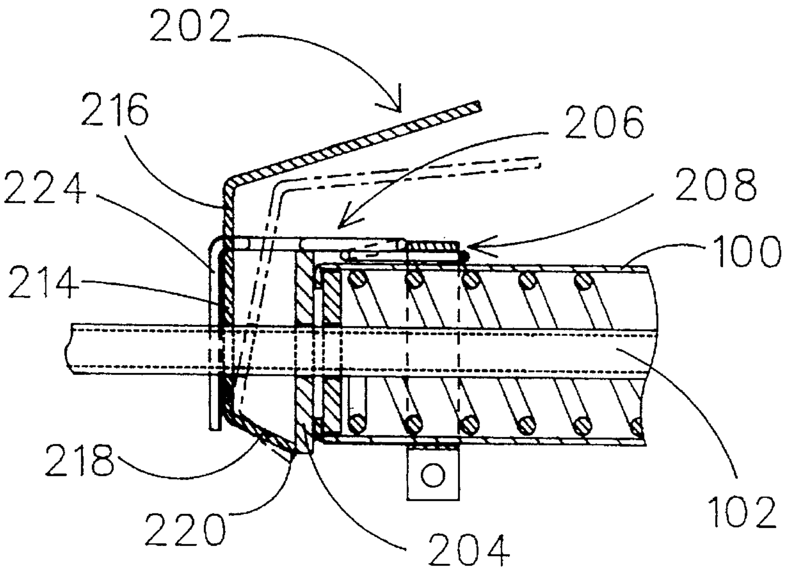
FIG. 15 is a vertical sectional view similar to FIG. 17 but showing a modification employing a manual release lever.
Figure 16:
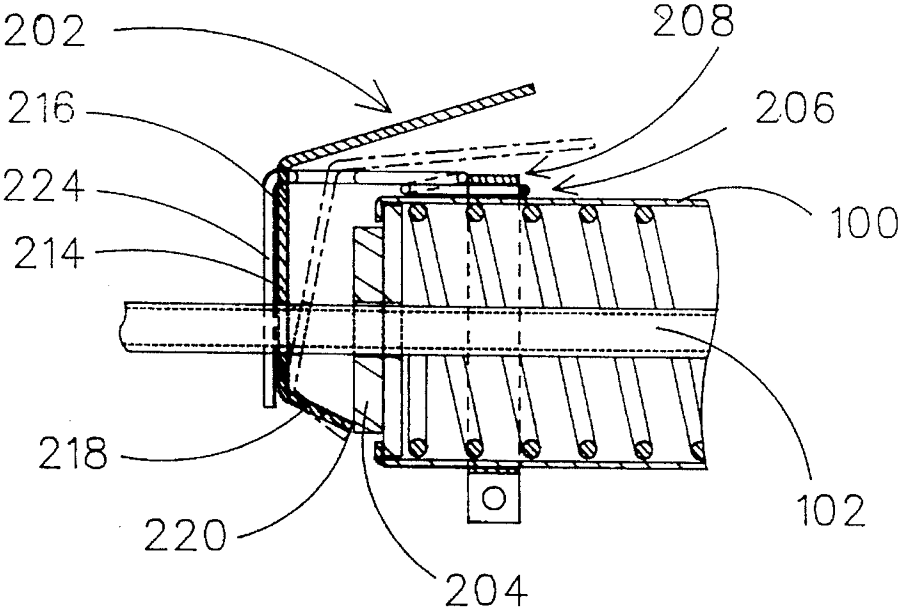
FIG. 16 is a vertical sectional view similar to FIG. 15 showing yet a further modification.

Referring next to FIGS. 12 to 16, the mechanism is shown as an attachment for an existing door closer of the concentric spring return type or the like. The mechanism comprises a wire retention spring 206, a brake 202 having a brake boss or disc-like annular portion 214 slidably located on central rod 102, a lever 216, which may be cranked or bent as shown in FIGS. 15 and 16 or straight as shown in FIGS. 12 and 13, and a tab 218. A clamp 208 attaches retention spring 206 to casing 100. Brake 202 is an L-shaped member with tab 218 forming a first leg and lever 216 forming a second leg including disc-like annular portion 214. Tab 218 extends toward housing 100 to engage the housing and cause brake 202 to pivot upon movement of rod 102.

When positioned as shown in FIG. 13, boss 214 is held in the transverse position normal to the axis of central rod 102 by a neck 222 and prongs 224 of retention spring 206. The neck 222 and prongs 224 form a latch to engage brake 44 and hold it in the transverse position. Prongs 224 also form a stop to prevent brake 202 from pivoting in the opposite direction as rod 102 is extended or retracted from casing 100. Tab 218 has a pivot edge 220 which abuts an end face of casing 100.

Moving lever 216 through neck 222 as indicated in chain-dotted lines in FIGS. 13 will position brake boss 214 oblique to central rod 102, thereby allowing it to cramp central rod 102. When brake boss 214 cramps central rod 102, said central rod 102 is prevented from retracting into casing 100 by tab 218 abutting the end face of casing 100.

However, extension of central rod 102 relieves the cramping action and allows further traversing of the central rod 102 through brake 202. Thus, central rod 102 may be extended through brake boss 214 while brake boss 202 is still somewhat oblique to central rod 102, and then prevents central rod 102 from retracting subsequently into casing 100.

Moving lever 216 through neck 222 positions or latches brake boss 214 in the transverse position normal to central rod 102 allowing the extension and retraction of central rod 102 at will.

Referring again to FIGS. 15 and 16 conversion washers 204 are shown located about central rod 102 to provide an abutment for tab 218 when the diameter of the existing door closer casing is smaller or larger that the distance pivot edge 220 is away from the longitudinal axis of the mechanism.

Having described preferred embodiments of the invention, it will be appreciated that various modifications could be made to the structures described above. For example, instead of rod 102 being biased into casing 100, it will be appreciated that spring 104 could be a compression spring biasing rod 102 out of casing 100. In this case, the brake and hold mechanism would be reversed in a manner that will be readily apparent to a person skilled in the art, so that rod 102 is braked and held at any desired retracted position instead of any desired extended position. Also, the embodiments shown in FIGS. 4 to 9 do not have closer springs 104, but such springs could be employed in these embodiments if desired. For the purposes of this disclosure, the rods 102 in the FIG. 4 to 9 embodiments are still considered to be biased into or out of the casings, either by gravity or by manual movement, however.

It will be apparent to those skilled in the art that in light of the foregoing disclosure, many alterations and modifications are possible in the practise of this invention without departing from the spirit or scope thereof. Accordingly, the scope of the invention is to be construed in accordance with the substance defined in the following claims.

What is claimed is:

1. An automatic brake and hold device for a mechanism having a housing and a rod adapted to be moved into or out of the housing, the rod having a longitudinal axis, the improvement comprising:

(a) a brake having opposed sides and a disc-like annular portion slidably located on said rod for frictionally cramping said rod upon the brake being pivoted from a transverse to an oblique position relative to said rod;

(b) means adapted to be attached to the housing for engaging one side of the brake to cause the brake to be pivoted into said oblique position upon movement of said rod in a first direction; and (c) a wire spring attached to the housing and engagable with the brake in the transverse position, the spring being located on the opposite side of the brake to engage and prevent the brake from pivoting into the oblique position and the transverse position upon movement of the rod in a second direction opposite to the first direction, the spring comprising a neck portion for engaging and holding the brake in the transverse position and in the oblique position, the brake comprising an L-shaped member having a first leg and a second leg, the second leg including the disc-like annular portion, one of the legs being engagable with the housing to pivot the brake upon movement of the rod.

2. The device of claim 1, wherein the wire spring comprises a pair of prongs connected to the neck portion and located to engage the brake in the oblique position and the transverse position.

3. The device of claim 1, comprising a brake trip attached to the housing and adapted to engage the brake when the brake is in the oblique position to releasably retatin the brake in the oblique position.

4. The device of claim 1, comprising a latch pivotally connected to the housing for engaging the brake.

5. The device of claim 4, comprising a brake lock attached to the housing and adapted to engage and prevent the latch from pivoting when the brake trip engages the brake.

6. An automatic brake and hold device for a mechanism having a housing and a rod biased to move in a biased direction into and out of the housing, the improvement comprising:

(a) a brake having opposed sides and a disc-like annular portion slidably located on the rod for frictionally cramping the rod upon the brake being pivoted from a transverse position to an oblique position relative to the rod, the housing including means for engaging one side of the brake to cause the brake to be pivoted and retained in the oblique position upon movement of the rod in said biased direction;

(b) a wire spring attached to the housing and located on the opposite side of the brake to prevent the brake from pivoting into the oblique position and the transverse position upon movement of the rod toward the wire spring, the spring comprising a neck portion for engaging the brake in the transverse position and in the oblique position, the brake comprising an L-shaped member having a first leg and a second leg, the second leg including the disc-like annular portion, one of the legs extending towards the housing to engage the housing to cause the brake to pivot upon movement of the rod; and (c) a latch pivotally connected to the housing for engaging the brake when the brake is in the transverse position and releasably retain the brake in the transverse position the latch.

7. An automatic brake and hold device for a mechanism having a housing and a rod biased to move in a biased direction into and out of the housing, the improvement comprising:

(a) a brake having opposed sides and a disc-like annular portion slidably located on the rod for frictionally cramping the rod upon the brake being pivoted from a transverse position to an oblique position relative to the rod, the housing including means for engaging one side of the brake to cause the brake to be pivoted and retained in the oblique position upon movement of the rod in said biased direction;

(b) a wire spring attached to the housing and located on the opposite side of the brake to prevent the brake from pivoting into the oblique position and the transverse position upon movement of the rod towards the wire spring, the spring comprising a neck portion for engaging the brake in the transverse position and in the oblique position, the brake comprising an L-shaped member having a first leg and a second leg, the second leg including the disc-like annular portion, one of the legs extending towards the housing to engage the housing to cause the brake to pivot upon movement of the rod, (c) a latch pivotally connected to the housing for engaging the brake when the brake is in the transverse position and releasably retain the brake in the transverse position the latch including a brake trip adapted to engage the brake when the brake is in the oblique position to releasably retatin the brake in the oblique position; and (d) a sleeve mounted on the rod to engage the brake upon predetermined extension of the rod and position the brake in the transverse position.

* * * * *